(12) United States Patent
Bröker (10) Patent No.: US 6,821,047 B2
(45) Date of Patent: Nov. 23, 2004

(54) BALL JOINT

(75) Inventor: Klaus Bröker, Bohmte-Hunteburg (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/333,292

(22) PCT Filed: May 21, 2002

(86) PCT No.: PCT/DE02/01857

§ 371 (c)(1),
(2), (4) Date: Jan. 16, 2003

(87) PCT Pub. No.: WO02/095247

PCT Pub. Date: Nov. 28, 2002

(65) Prior Publication Data

US 2003/0152420 A1 Aug. 14, 2003

(30) Foreign Application Priority Data

May 22, 2001 (DE) .......................................... 101 25 227

(51) Int. Cl.[7] ................................................ F16C 11/06
(52) U.S. Cl. ........................ 403/132; 403/138; 403/144; 403/145; 403/147
(58) Field of Search .............................. 403/90–93, 96, 403/97, 122, 132–133, 135–138, 140–144, 146, 147

(56) References Cited

U.S. PATENT DOCUMENTS

| | | | |
|---|---|---|---|
| 3,362,735 A | | 1/1968 | Maxeiner |
| 4,076,344 A | | 2/1978 | Gaines et al. |
| 4,690,581 A | | 9/1987 | Umemoto et al. |
| 5,188,477 A | * | 2/1993 | Idosako et al. ............. 403/133 |
| 5,772,337 A | * | 6/1998 | Maughan et al. ....... 403/140 X |
| 5,851,082 A | * | 12/1998 | Schmudde et al. ......... 403/133 |
| 6,019,541 A | * | 2/2000 | Maughan .................... 403/140 |
| 6,164,861 A | | 12/2000 | Maughan |

FOREIGN PATENT DOCUMENTS

| | | |
|---|---|---|
| DE | 36 19 004 | 12/1987 |
| DE | 197 55 284 | 6/1999 |
| DE | 199 30 445 | 1/2001 |
| FR | 2 444 192 | 12/1978 |

* cited by examiner

Primary Examiner—Gregory J. Binda
Assistant Examiner—Ryan M. Flandro
(74) Attorney, Agent, or Firm—McGlew and Tuttle, P.C.

(57) ABSTRACT

A ball-and-socket joint (1) is provided with a housing (2) closed by a cover (3), with a bearing shell (5, 6) and a joint ball (4) accommodated therein rotatably and tiltably with a ball pivot. The bearing shell (6) provided with projections and offsets on its outside as well as an entropy-elastic, pretensioned spring element (7) are fixed by the cover (3) in the housing (2). The bearing shell is formed by lower and upper bearing shells (5, 6), both of which are closed, and the lower bearing shell (5) extending partially over the upper bearing shell (6) is provided on its overarching inside (5b) and the upper bearing shell (6) is provided on its outside (6a) with the projections and offsets (20, 21; 11, 12) with which the entropy-elastic spring element (7) cooperates in a positive-locking and/or non-positive manner under the action of the cover (3) in its closed position and nonrotatably couples the two bearing shells (5, 6) with one another.

19 Claims, 6 Drawing Sheets

BALL JOINT

FIELD OF THE INVENTION

The present invention pertains to a ball-and-socket joint with a housing closed by a cover, with a bearing shell and a joint ball accommodated therein rotatably and tiltably with a ball pivot, which protrudes with a shaft from an opening of the housing located opposite the cover, wherein the bearing shell provided with projections and offsets on its outside as well as an entropy-elastic, pretensioned spring element are fixed by the cover in the housing.

BACKGROUND OF THE INVENTION

A ball-and-socket joint of this type has become known from DE 199 30 445 A1. The bearing shell fixed in the housing has an axially extending, continuous slot, and the cover has the pretensioned spring element fixed between the cover and the bearing shell on its inside facing the bearing shell, and the spring element is pressed by the cover against the adjoining projections and offsets in the form of radially extending ribs and grooves of the bearing shell. The bearing shell is provided with the axially extending, continuous slot to enable a joint ball to be inserted.

This slot has the drawback that material "flows" from the bearing shell into the slot under corresponding axial and radial loads of the ball-and-socket joint, as a result of which the closing forces are loosened and the ball-and-socket joint tends to have an undesired clearance between the joint ball and the bearing shell.

In addition, the bearing shell must have a certain elasticity in order to press the joint ball into the bearing shell while the slot widens. Therefore, only materials that possess this elasticity can be used for the bearing shell, but this in turn is to the detriment of the wear resistance.

In a ball-and-socket joint of a different type according to DE 36 19 004 C1, the bearing shell comprises two bearing shells fitted concentrically into one another, namely, an inner bearing shell made of a soft elastic material and an outer shell made of a hard elastic material, which are provided with an opening to accommodate the grease reservoir as well as with concentrically extending lubricating grooves on their contact surfaces. The outer shell is provided with equidistant, axially extending longitudinal slots in order to enable the ball head to be inserted while a radial widening takes place. Under high radial load, the material of the outer shell begins to flow into these radial slots, as a result of which the clearance between the ball and the outer shell inevitably increases. This ball-and-socket joint is therefore limited to the material-dependent load possibilities of the material of the outer shell, here polyoxymethylene (POM), with its radial slots. An automatic, clearance-equaling compensation mechanism is lacking.

Another ball-and-socket joint of a different class has become known from DE 197 55 284 A1, whose joint ball is surrounded in some sections by a bearing shell, whose calotte-shaped inner jacket surface with its cylindrical outer jacket surface is inserted into a mounting hole of a housing, wherein the bearing shell is embedded on its outer jacket surface in a sleeve manufactured from a rubber-elastic elastomer, which is in contact with the mounting hole. The sleeve, which is obviously manufactured from an entropy-elastic material with a spring hardness lower than that of the bearing shell shall damp vibrations between the joint ball and the outer housing. Since the bearing shell and the sleeve form two springs connected in series in relation to the joint ball, their overall spring hardness is always lower than the individual spring hardnesses of the bearing shell and the sleeve. This leads, besides to an undesired clearance, to a ball-and-socket joint with low internal damping. A compensating means that would compensate the clearance between the ball-and-socket joint and the bearing shell during the progression of the wear is lacking.

SUMMARY OF THE INVENTION

Based on this closest state of the art, the basic object of the present invention is to provide a ball-and-socket joint of the type mentioned in the introduction, which, while having a simple design and a high wear resistance, is characterized not only by the fact that the bearing shell is secured against rotation, but also by an elastic clearance compensation mechanism of the ball pivot in the radial and axial directions, which it can offer in relation to the ball-and-socket joint housing.

This object is accomplished according to the present invention in conjunction with the generic features mentioned in the introduction by the bearing shell being formed by a lower and an upper bearing shell, both of which are closed, and by the lower bearing shell, which partially extends over the upper bearing shell, being provided on its overarching inside and/or the upper bearing shell being provided on its outside with the projections and offsets with which the entropy-elastic spring element cooperates in a positive-locking or non-positive manner under the action of the cover in its closed position and couples the two bearing shells with one another in a nonrotatable manner. Due to this arrangement, the lower bearing shell absorbing the principal loads may consist of a highly wear-resistant material with small clearance, whereas the upper bearing shell, which is to absorb stronger forces, can be manufactured at a low cost from the proven conventional plastics, which are softer than the above-mentioned material. Due to the positive-locking and/or non-positive entropy-elastic coupling of the upper and lower bearing shells with the spring element and with the cover, which coupling is always a spring-elastically pretensioned coupling, an elasticity of the joint is obtained, which automatically compensates an increasing clearance resulting from wear at a small clearance because of the pretension.

The lower bearing shell, which is made of a very hard and wear-resistant material, e.g., PEEK, PEI, PA 66, GFP (A3 WG6), and which extends beyond the meridian plane of the joint ball because it extends over the upper bearing shell, can thus absorb most of both the axial forces and the possible radial forces, whereas the upper bearing shell is mainly to transmit the entropy-elastic forces originating from the pretensioned spring element, which determine the elasticity of the joint. In any case, the cover acts as a tensioning element, as in the closest state of the art.

The lower bearing shell is advantageously provided at its end extending over the upper bearing shell with a flange, which is nonrotatably pretensioned between a shoulder of the housing and the cover for securing against rotation.

To increase this securing against rotation, the cover is advantageously also provided with projections and offsets on its underside, which are engaged by the entropy-elastic spring element, which couples the two bearing shells in a positive-locking manner as well as nonrotatably with the cover. As a result, the cover and the entropy-elastic spring element as well as the upper and lower bearing shells are secured against rotation in a stable manner, meeting all requirements. The projections and offsets of the two bearing shells and in the cover are advantageously formed from prior-art ribs and grooves, all of which extend radially to the longitudinal axis as well as equidistantly. As a result, the entropy-elastic spring element can engage the grooves of the two bearing shells and of the cover in a positive-locking manner and thus bring about a both positive-locking and non-positive coupling.

The lower bearing shell is advantageously provided for this purpose with a circular ring of ribs and grooves on its inside in the vicinity of its flange, while the upper bearing shell has a hood shape, which is known per se, and is provided with radially extending ribs and grooves on its outside.

According to an advantageous variant of the present invention, the ribs of the upper bearing shell have a radially circular recess of approximately trapezoidal cross section for the positive-locking insertion of the entropy-elastic spring element, with all recesses forming a circularly extending ring, which are joined by the equidistant projections and offsets. This facilitates the insertion of the entropy-elastic spring element, which advantageously consists of an elastomer ring, whose cross-sectional shape is composed of a rectangle on the outside and of a triangle on the inside, wherein all edge areas are radially rounded to reduce notch effects.

According to an especially advantageous variant of the present invention, the entropy-elastic spring element protrudes over the top edge of the flange of the lower bearing shell before the insertion of the cover by an amount corresponding to the desired spring pretension. As soon as the cover is pressed against the top side of the circular flange of the lower bearing shell, the desired pretension is applied to the spring element, which can otherwise occur automatically in a force- and displacement-controlled manner during the closing of the cover.

The entropy-elastic spring element advantageously lies by one of its triangular surfaces and one of its flat rectangular surfaces on the recesses of the ribs of the upper bearing shell and is in contact by its upper outer circumferential side with the ring of grooves and ribs of the lower bearing shell, and the spring element is always pressed against these ribs and into the grooves as well as against the optionally present ribs and into the grooves of the cover under the spring pretension after reaching its final assembled position.

The entropy-elastic spring element is advantageously made of an acrylonitrile-butadiene polymer with a Shore A hardness of 80±5.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
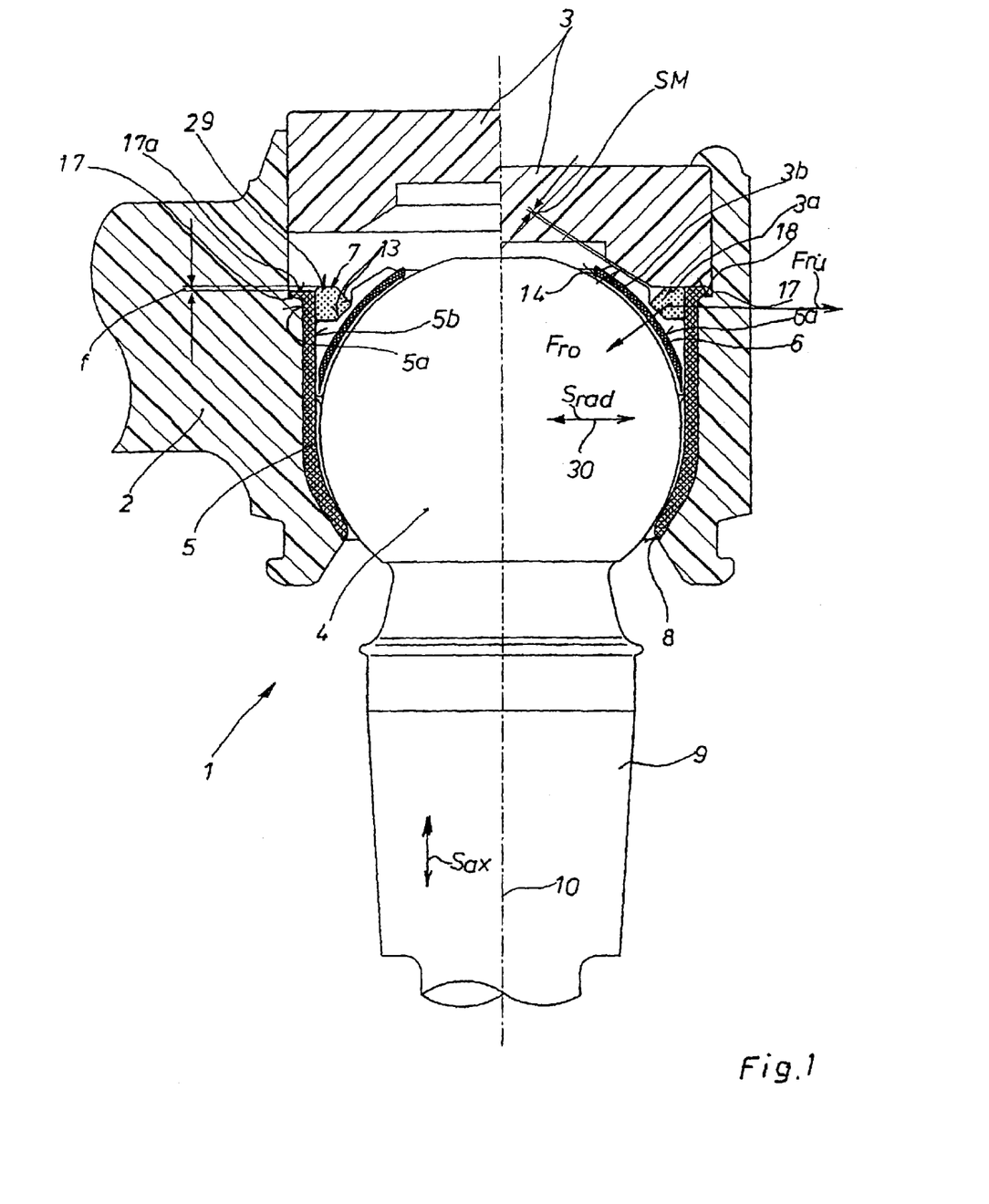
FIG. 1 is an overall cross section through the ball-and-socket joint according to the present invention, the left-hand side of the figure showing the nontensioned final assembled state and the right-hand side of the figure showing the pretensioned final assembled state.
Figure 2:
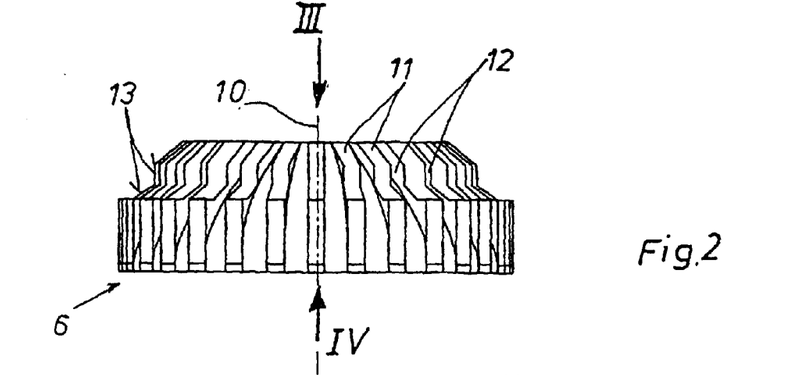
FIG. 2 is a side view of the upper bearing shell.
Figure 3:
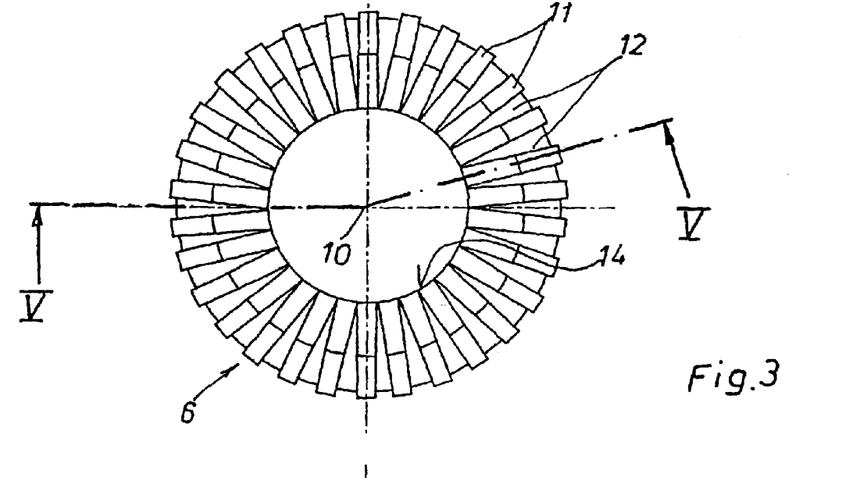
FIG. 3 is a top view of the upper bearing shell in the direction of arrow III in FIG. 2.
Figure 4:
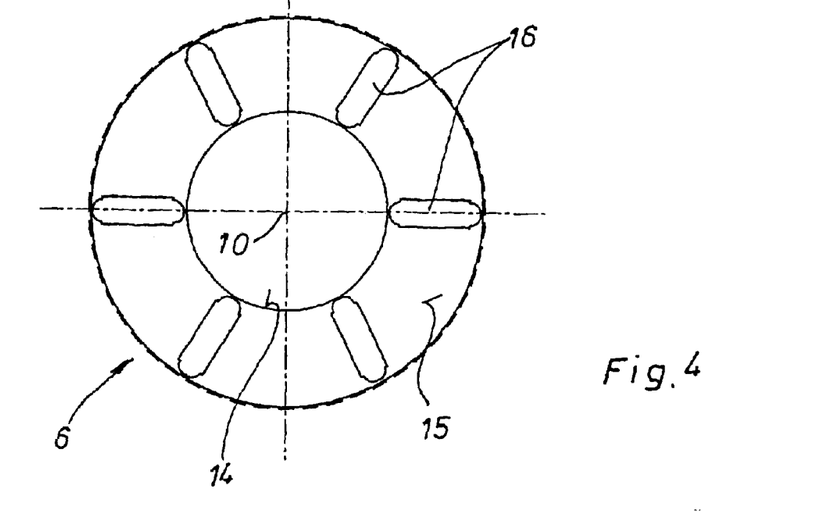
FIG. 4 is a bottom view of the upper bearing shell in the direction of arrow IV in FIG. 2.
Figure 5:
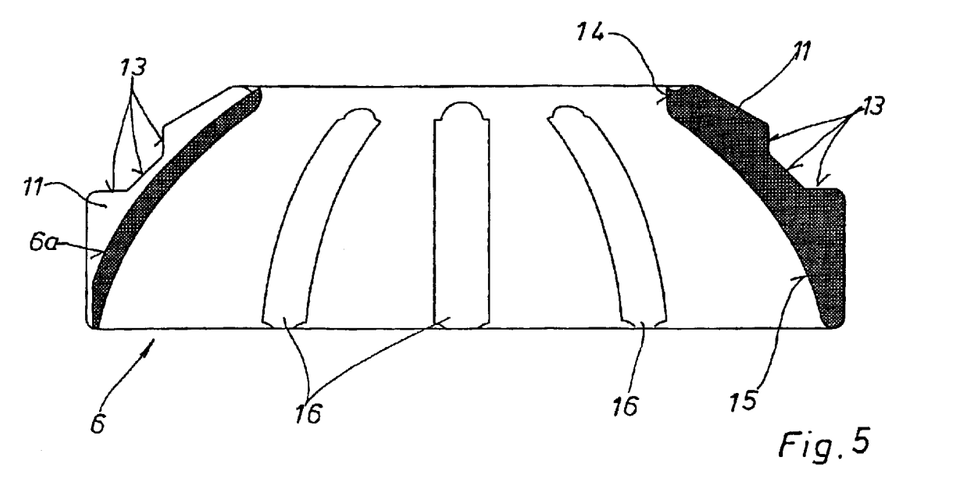
FIG. 5 is an enlarged view of a diametric cross-sectional view through the upper bearing shell according to line V—V in FIG. 3.

Referring to the drawings in particular, according to FIG. 1, the ball-and-socket joint 1 according to the present invention comprises essentially a housing 2, a cover 3 and a joint ball 4, which is accommodated in a lower bearing shell 5 and an upper bearing shell 6. Both bearing shells 5, 6 cooperate with an entropy-elastic spring element 7 in the form of a ring, which is pressed against both bearing shells 5, 6 on the underside 3a of the cover 3 in the final assembled position shown in the right-hand half of the figure. The pivot pin 9 of the joint ball 4 protrudes from the housing 2 from the opening 8 located opposite the cover 3.

As can be determined from FIGS. 2 through 5, the upper bearing shell 6 is provided on its outside 6a with ribs 11 and grooves 12 extending radially to the longitudinal axis 10 of the ball-and-socket joint 1. The ribs 11 have a radially extending trapezoidal recess 13 (see FIG. 5), into which the entropy-elastic as well as annular spring element 7 to be described below is fitted. The hood-shaped upper bearing shell 6 is provided with a circular outlet 14 on its top side and with six radially arranged lubricating grooves 16 on its underside 15. This upper bearing shell 6 may consist of the proven materials POM, PA 66 or also highly wear-resistant PEEK or PEI.

Figure 6:
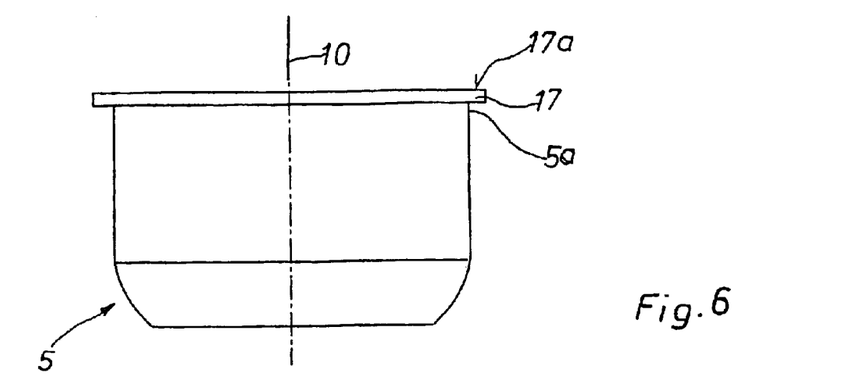
FIG. 6 is a side view of the lower bearing shell with its flange.
Figure 7:
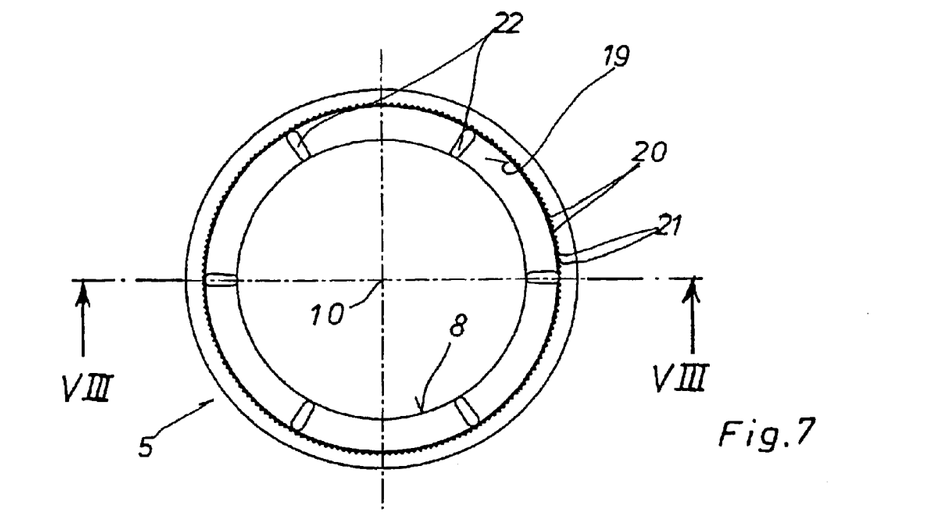
FIG. 7 is a top view of the lower bearing shell.
Figure 8:
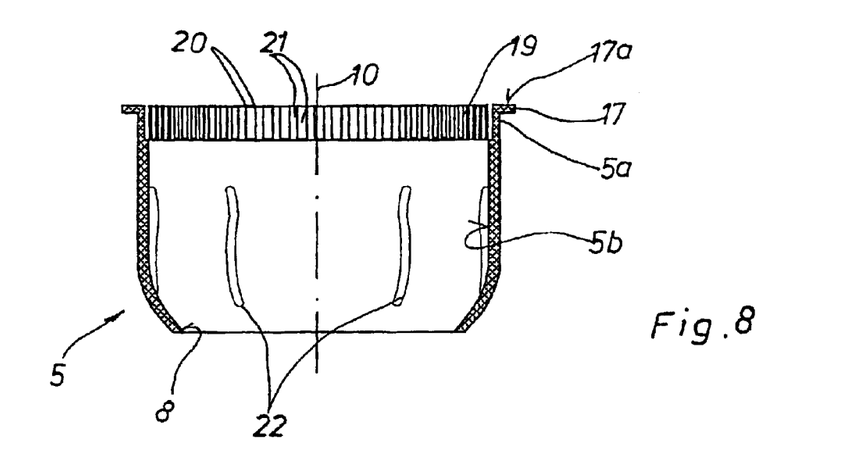
FIG. 8 is a sectional view of the lower bearing shell along line VIII—VIII in FIG. 7.

According to FIGS. 6 through 8, the lower bearing shell 5 is provided at its end 5a extending over the upper bearing shell 6 with a flange 17, which is braced nonrotatably between a shoulder 18 of the housing 2 and the cover 3. As can be determined especially from FIGS. 7 and 8, the lower bearing shell 5 is provided with a circular ring 19 of ribs 20 and grooves 21 on its inside 5b in the vicinity of its flange 17. Furthermore, a total of six radially extending lubricating grooves 22 are arranged in the inside 5b of the lower bearing shell 5.

Figure 10:
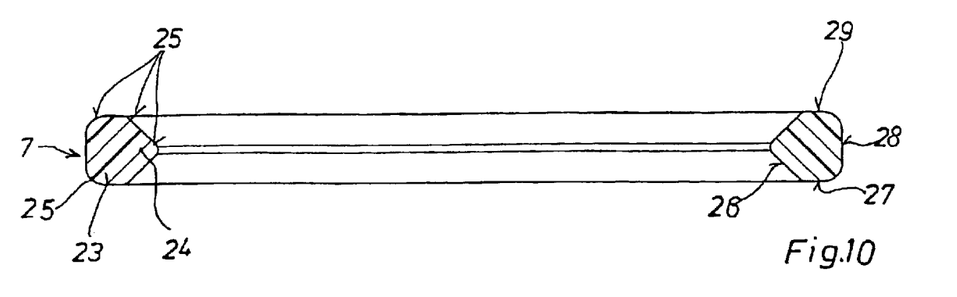
FIG. 10 is an enlarged view of the diametric sectional view of the entropy-elastic spring element.
Figure 11:
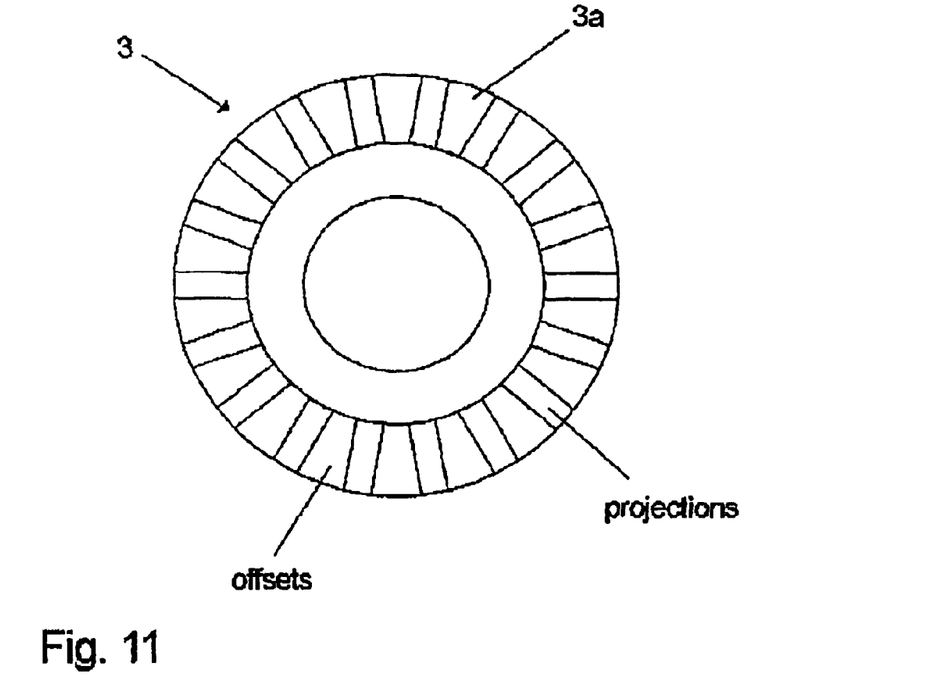
FIG. 11 is a view of the projections and offsets provided on the underside of the cover.
Figure 12:
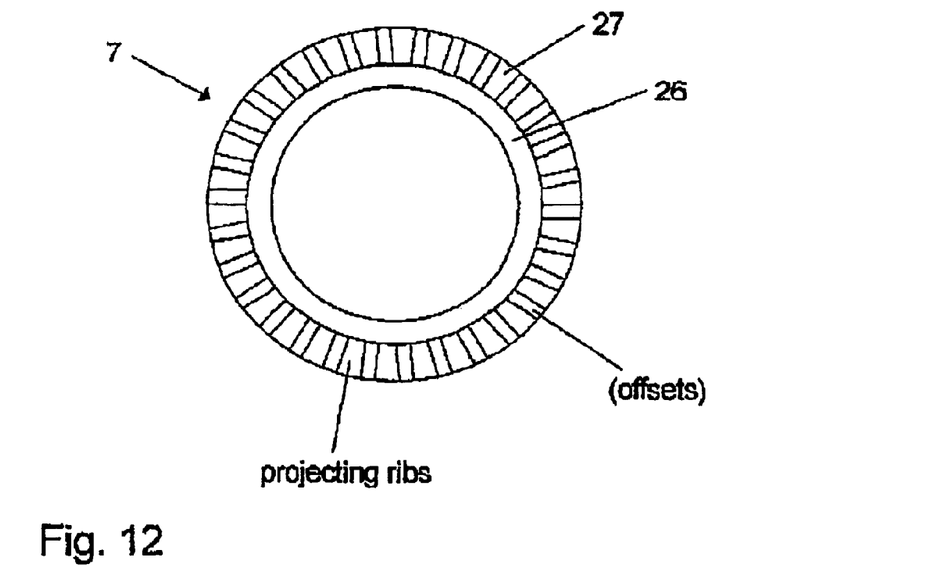
FIG. 12 is a view of the projecting ribs and offsets of the entropy-elastic spring element.

The elastomer ring 7 shown in FIG. 10 has a cross-sectional shape that is composed of a rectangle 23 on the outside and of an isosceles triangle 24 on the inside, all edge areas 25 being radially rounded.

Figure 9:
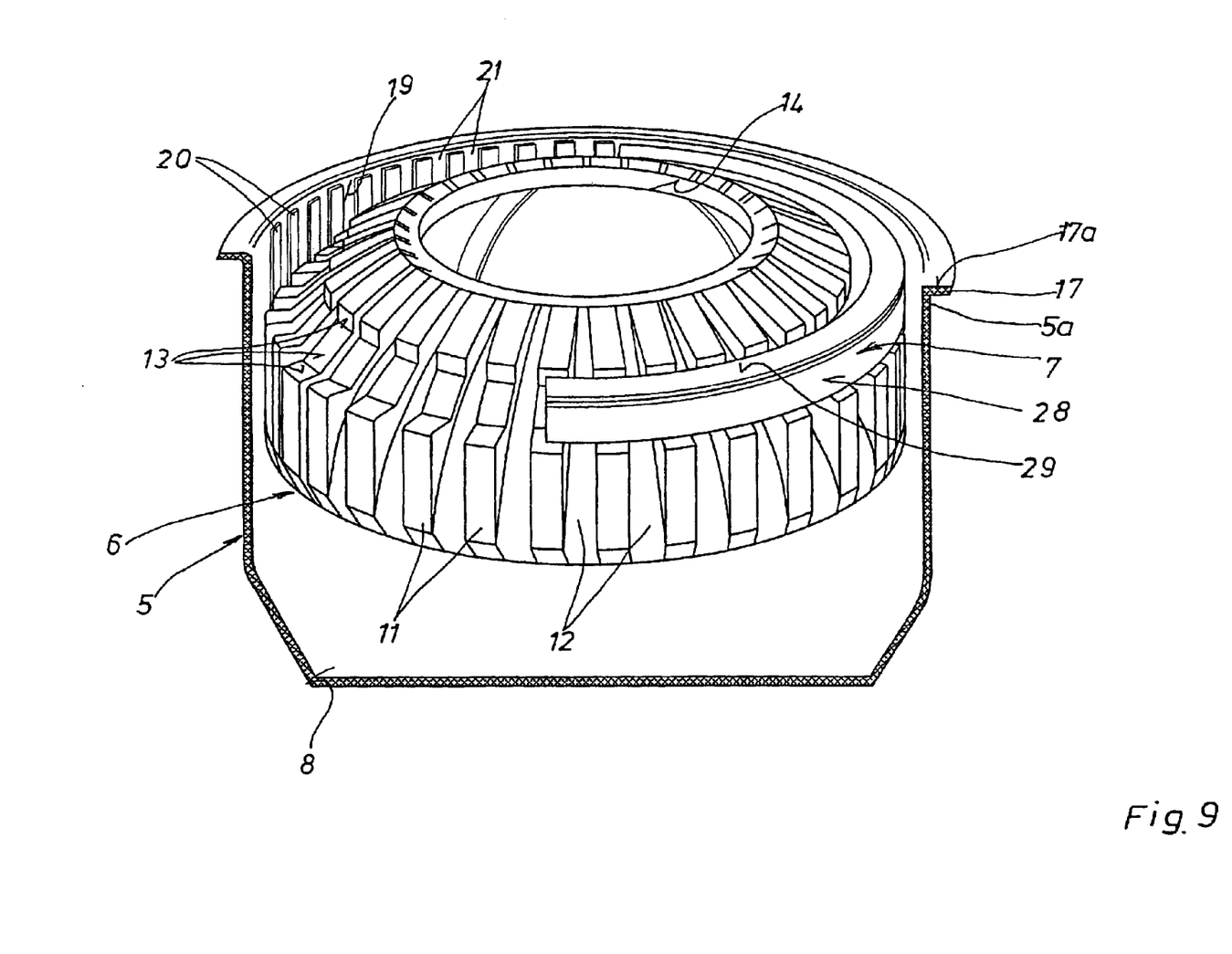
FIG. 9 is a partially cut-way perspective view of the upper bearing shell, lower bearing shell with the ring-shaped spring element inserted.

As can be determined from FIG. 1 in conjunction with FIG. 9, the entropy-elastic spring element 7 lies on the recesses 13 of the ribs 11 of the upper bearing shell 6 with its two triangular surfaces, namely with the triangular surface 26 and one of its flat rectangular surfaces, namely, with the rectangular surface 27, and is in contact with the ring 19 of grooves 21 and ribs 20 of the lower bearing shell 5 with its flat outer circumferential side 28, and is pressed against these surfaces and—if present—also against the ribs and grooves of the cover 3 under a spring pretension Fv in its final assembled position (see right-hand half of FIG. 1).

The spring pretension Fv is determined by the height, which can be seen in the left-hand part of FIG. 1, by which the rectangle side 29 of the entropy-elastic spring element 7 protrudes over the top edge 17a of the flange 17.

After the entropy-elastic spring element 7 has been compressed according to the right-hand half of FIG. 1, part of the material of the spring element is pressed into both the grooves 12 of the upper bearing shell 6 and the grooves 21 of the lower bearing shell 5 as well as into any grooves that may be present in the cover 3. To make this pressing in more positive-locking, the entropy-elastic spring element 7 may likewise be provided on its contact surfaces 27, 28, 29 with projecting ribs, which engage the corresponding grooves 12, 21 in an accurately fitting manner according to a variant of the present invention.

As is apparent from FIG. 1, the closing force Fv, which acts in parallel to the longitudinal axis 10 and applies the pretensioning force, is split in the parallelogram of forces into a force component acting radially on the upper bearing shell 6 and a force component acting perpendicularly on the inner wall of the lower bearing shell 5. The force component FrU acting on the lower bearing shell is absorbed by the housing 2, so that an undesired bending off in the direction of the arrow FrU does not occur. The force component FrO is always directed toward the upper bearing shell 6 and as a result, it correspondingly always presses this against the joint ball 4 in a clearance-free manner. Thus, in conjunction with the cover 3 and the upper bearing shell 6, the entropy-elastic spring element 7 forms a clearance-compensating system in relation to the joint ball 4 of the ball-and-socket joint 1, which determines the elasticity of the joint.

In addition, the size of the gap SM between the underside 3b of the cover and the adjoining ribs 11 of the upper bearing shell 6, which may range from 0 to a maximum allowable value, can be determined in conjunction with this clearance-compensating system.

The more frequent pressure loads are, the smaller is the value selected for this gap. These pressure loads act in parallel to the longitudinal axis 10. Thus, while the upper bearing shell 6 and the lower bearing shell 5 are permanently secured against rotation, the torque MD that must be applied during a rotary or pivoting movement of the ball pivot 9, as well as the displacement $S_{ax}$ that the ball pivot 9 can perform in the axial direction of the longitudinal symmetry axis 10 in relation to the ball-and-socket joint housing 2, as well as the displacement $S_{rad}$ that the joint ball 4 can perform in the radial direction according to arrow 30 in relation to the ball-and-socket joint housing 2 in an elastic manner can be easily set on the basis of the pretension f as well as the gap SM.

The torque or tilting moment or $S_{ax}$ and $S_{rad}$ can consequently be generated by pretensioning the ball shells.

While a specific embodiment of the invention has been shown and described in detail to illustrate the application of the principles of the invention, it will be understood that the invention may be embodied otherwise without departing from such principles.

What is claimed is:

1. A ball-and-socket joint, comprising:
   a housing closed by a cover;
   a bearing shell accommodated in said housing;
   a joint ball accommodated rotatably and tiltably in said housing, said joint ball with a pivot pin protruding with a shaft from an outlet of said housing located opposite said cover, wherein said bearing shell is provided with projections and offsets on its outside; and
   an entropy-elastic pretensioned spring element fixed by said cover in said housing, said bearing shell being formed by lower and upper bearing shells both of which are closed, said lower bearing shell partially extending over said upper bearing shell, said lower bearing shell being provided on an overarching inside and said upper bearing shell being provided on an outside with said projections and offsets, said entropy-elastic spring element cooperating in a closed position in a positive-locking or non-positive manner under the action of said cover and coupling said two bearing shells with one another in a nonrotatable manner, said cover also being provided on an underside with projections and offsets, which are engaged by said entropy-elastic spring element which couples said two bearing shells with said cover in a positive-locking manner as wall as nonrotatably.

2. A ball-and-socket joint in accordance with claim 1, wherein said lower bearing shell is provided at its end extending over said upper bearing shell with a flange braced nonrotatably between a shoulder of said housing and said cover.

3. A ball-and-socket joint in accordance with claim 1, wherein said projections and offsets of said two bearing shells and in said cover are formed from ribs and grooves all of which extend radially to a longitudinal axis of said bearing shell as well as equidistantly.

4. A ball-and-socket joint in accordance with claim 1, wherein said lower bearing shell is provided with a flange and a circular ring of ribs and grooves on an inside in a vicinity of said flange.

5. A ball-and-socket joint in accordance with claim 1, wherein said upper bearing shell has a hood shape and is provided with radially extending ribs and groves on an outside.

6. A ball-and-socket joint in accordance with claim 5, wherein said ribs of said upper bearing shell have a radially extending recess of trapezoidal cross section for inserting said entropy-elastic spring element, wherein all said recesses form a circularly extending ring, which is joined by said equidistant projections and offsets.

7. A ball-and-socket joint in accordance with claim 1, wherein said entropy-elastic spring element comprises an elastomer ring, whose cross-sectional shape is composed of a rectangle on an outside and a triangle on an inside with all edge areas being radially rounded.

8. A ball-and-socket joint in accordance with claim 1, wherein said lower bearing shell has a flange and said entropy-elastic spring element protrudes over a top edge of said flange of said lower bearing shell, before the insertion of said cover, by a height corresponding to a desired spring pretension.

9. A ball-and-socket joint in accordance with claim 1, wherein said lower bearing shell is made of a highly wear-resistant plastic comprising one or more of PEEK, PEI, PA 66, GFP (A3 WG6).

10. A ball-and-socket joint in accordance with claim 1, wherein said upper bearing shell consists of either POM, PA 66 or PEEK or PEI.

11. A ball-and-socket joint in accordance with claim 1, wherein said entropy-elastic spring element is made of an acrylonitrile-butadiene polymer with a Shore A hardness of 80±5.

12. A ball-and-socket joint, comprising:

a housing;

a cover closing the housing;

a joint ball accommodated rotatably and tiltably in the housing, the joint ball with a pivot pin protruding with a shaft from an outlet of the housing located opposite the cover;

an upper bearing shell;

a lower bearing shell, said lower bearing shell partially extending above said upper bearing shell, said lower bearing shell being provided with overarching portion having an inside with projections and offsets and said upper bearing shell being provided on an outside with projections and offsets; and an entropy-elastic pretensioned spring element fixed by the cover in the housing, said entropy-elastic spring element cooperating with one or more of said projections and offsets under the action of the said cover and coupling said two bearing shells with one another in a nonrotatable manner.

13. A ball-and-socket joint in accordance with claim 12, wherein said lower bearing shell overarching portion is provided with an end having a flange braced nonrotatably between a shoulder of said housing and said cover.

14. A ball-and-socket joint in accordance with claim 13, wherein said cover has an underside with projections and offsets engaged by said entropy-elastic spring element to couple said two bearing shells with said cover nonrotatably with positive-locking.

15. A ball-and-socket joint in accordance with claim 14, wherein said projections and offsets of said two bearing shell and in said cover are formed from equidistant ribs and grooves extending radially to a longitudinal axis of the ball-and-socket joint.

16. A ball-and-joint in accordance with claim 12, wherein said upper bearing shell has a hood shape and is provided with radially extending ribs and groves on an outside as said projections and offsets, wherein said ribs of said upper bearing shell have a radially extending recess of trapezoidal cross section for inserting said entropy-elastic spring element, wherein all said recesses form a circularly extending ring, which is joined by said equidistant projections and offsets.

17. A ball-and-socket joint in accordance with claim 16, wherein said entropy-elastic spring has a triangular end surface and a flat rectangular surface and lies on said recesses of ribs of said upper bearing shell and is in contact on a flat outer circumferential side with a ring of said grooves and said ribs of said lower bearing shell and is pressed by said cover against said ribs and said groves as well as against the ribs and into the grooves of said cover under a spring pretension of said spring after being disposed in a final assembled position.

18. A ball-and-socket joint, comprising:

a housing closed by a cover;

a bearing shell accommodated in said housing;

a joint ball accommodated rotatably and tiltably in said housing, said joint ball with a pivot pin protruding with a shaft from an outlet of said housing located opposite said cover, wherein said bearing shell is provided with projections and offsets on its outside; and an entropy-elastic pretensioned spring element fixed by said cover in said housing, said bearing shell being formed by lower and upper bearing shell both of which are closed, said lower bearing shell partially extending over said upper bearing shell, said lower bearing shell being provided on an overarching inside and said upper bearing shell being provided on an outside with said projections and offsets, said entropy-elastic spring element cooperating in a closed position in a positive-locking or non-positive manner under the action of said cover and coupling said two bearing shells with one another in a nonrotatable manner, said entropy-elastic spring having triangular and flat rectangular surfaces and lies on a recesses of ribs of said upper bearing shell and is in contact on a flat outer circumferential side with a ring of grooves and said ribs of said lower bearing shell and is pressed by said cover against said ribs and said groves as well as against the ribs and into the grooves of said cover under a spring pretension of said spring after being disposed in a final assembled position.

19. A ball-and-socket joint, comprising:

a housing closed by a cover;

a bearing shell accommodated in said housing;

a joint ball accommodated rotatably and tiltably in said housing, said joint ball with a pivot pin protruding with a shaft from an outlet of said housing located opposite said cover, wherein said bearing shell is provided with projections and offsets on its outside; and an entropy-elastic pretensioned spring element fixed by said cover in said housing, said bearing shell being formed by lower and upper bearing shells both of which are closed, said lower bearing shell partially extending over said upper bearing shell, said lower bearing shell being provided on an overarching inside and said upper bearing shell being provided on an outside with said projections and offsets, said entropy-elastic spring element cooperating in a closed position in a positive-locking or non-positive manner under the action of said cover and coupling said two bearing shells with one another in a nonrotatable manner, said entropy-elastic spring element being provided on contact surfaces with projecting ribs, which engage adjoining grooves of said lower and upper bearing shells as well as of said cover.

* * * * *